United States Patent [19]

Veenhof

[11] Patent Number: 4,821,867
[45] Date of Patent: Apr. 18, 1989

[54] CONTROLLED DEFLECTION OF FLEXIBLE SCRAPER STRANDS

[76] Inventor: Willem D. Veenhof, 4501 Soundside Dr., Gulf Breeze, Fla. 32561

[21] Appl. No.: 202,949

[22] Filed: Jun. 6, 1988

Related U.S. Application Data

[62] Division of Ser. No. 41,777, Apr. 23, 1987, abandoned.

[51] Int. Cl.$^4$ .............................................. B65G 45/00
[52] U.S. Cl. ........................................ 198/499; 15/256.5
[58] Field of Search ................. 198/497, 499; 15/256.5

[56] References Cited

U.S. PATENT DOCUMENTS

| 2,227,776 | 1/1941 | Anderson | 198/229 |
|---|---|---|---|
| 2,303,211 | 11/1942 | Heetderks | 68/270 |
| 2,878,926 | 3/1959 | Harty et al. | 198/230 |
| 3,047,133 | 7/1962 | Searles | 198/230 |
| 3,430,758 | 3/1969 | Searles | 198/230 |
| 4,349,098 | 9/1982 | Veenhof | 198/497 |
| 4,498,577 | 2/1985 | Veenhof | 198/499 |
| 4,662,507 | 5/1987 | Veenhof | 198/499 |
| 4,703,845 | 11/1987 | Veenhof | 198/499 |

FOREIGN PATENT DOCUMENTS

| 801144 | 12/1950 | Fed. Rep. of Germany . |
|---|---|---|
| 1216193 | 5/1966 | Fed. Rep. of Germany . |
| 1575879 | 7/1969 | France . |
| 421592 | 3/1974 | U.S.S.R. . |
| 481506 | 12/1975 | U.S.S.R. . |
| 719940 | 3/1980 | U.S.S.R. . |
| 707907 | 4/1954 | United Kingdom . |
| 1331222 | 9/1973 | United Kingdom . |
| 1433659 | 4/1976 | United Kingdom . |
| 1548051 | 7/1979 | United Kingdom . |

*Primary Examiner*—Robert J. Spar
*Assistant Examiner*—Lyle K. Rimms
*Attorney, Agent, or Firm*—Dennis T. Griggs

[57] ABSTRACT

A conveyor belt scraper assembly includes an array of transversely extending, flexible scraper members engaging, in an operative position, a conveyor belt surface to be cleaned. The flexible scraper members are resiliently biased in frictional engagement with the curved surface of the conveyor belt by a tension spring. Each scraper member includes a flexible tension member, a plurality of scraper blades movably coupled to the tension member, and spacer springs yieldably separating the scraper blades. The scraper blades are differently sized relative to each other to impose different static deflections at separate points along the flexible tension member relative to the conveyor belt surface. According to this arrangement, the deflection forces are shifted to the scraper blades along the trailing end of the cable, thereby avoiding a concentration of forces on the leading scraper blade which could lead to premature wear and breakage of the tension member.

6 Claims, 5 Drawing Sheets

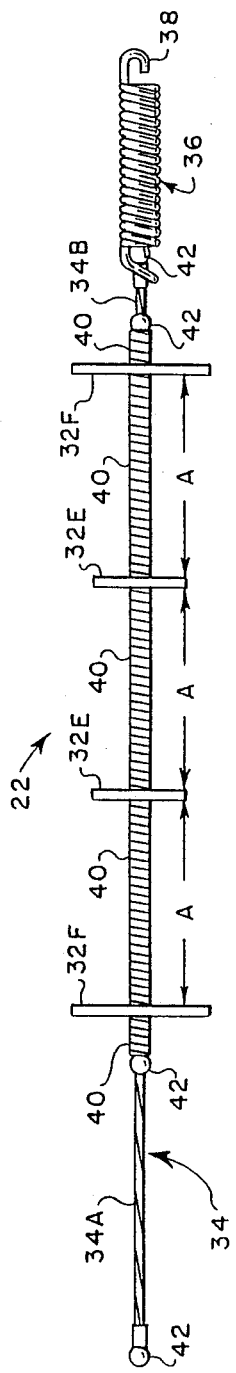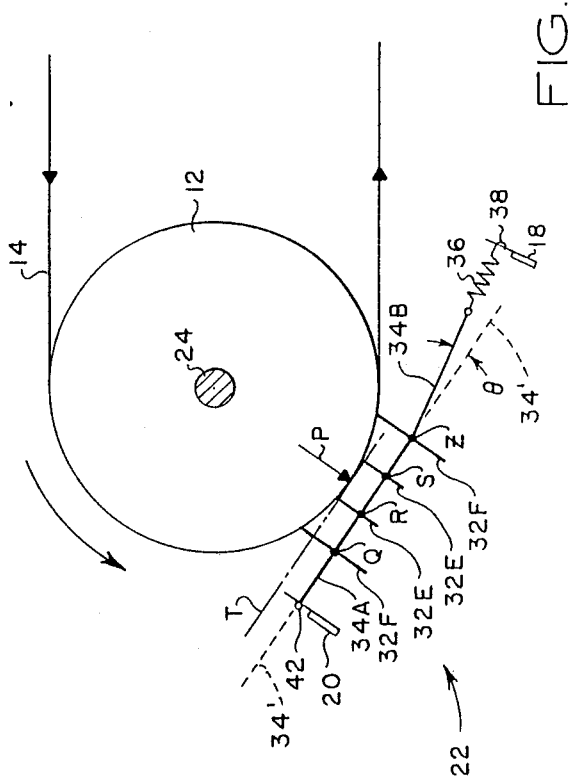
FIG. 13
FIG. 14

CONTROLLED DEFLECTION OF FLEXIBLE SCRAPER STRANDS

This is a division of application Ser. No. 041,777, filed Apr. 23, 1987, now abandoned.

FIELD OF THE INVENTION

This invention relates to cleaning or scraping devices utilized for removing material which adheres to a conveyor belt or pulley drum.

BACKGROUND OF THE INVENTION

In the operation of bulk material belt conveyors, a scraper assembly is provided for removing adhering material from the load surface of a conveyor belt and depositing it into a discharge area. In the absence of a cleaning device, or as a result of a poorly functioning belt scraper, carry-over will be accumulated beneath the conveyor belt. In addition to constituting a nuisance, a large amount of valuable product will be deposited beneath the conveyor and may build-up sufficiently to interfere with operation of the conveyor. For example, a volume of spillage material 1/16" (1.6mm) deep and 1" (25mm) wide will produce approximately 2½ cubic feet (0.075 cubic meters) of carry-over per 100 feet per minute (0.48 meters per second) of belt speed each hour. At a conveyor speed of 500 feet per minute (2.5 meters per second), this small stream produces approximately 10 tonnes of carry-over spillage every eight hours, based on a density of 100 lbs per cubic foot (1500 kg/cubic meter). Consequently, there is considerable interest in improving the operation and efficiency of conveyor belt cleaning devices.

DESCRIPTION OF THE PRIOR ART

Conventional conveyor belt cleaning devices generally include one or more blades disposed in a plane transverse to the conveyor belt and are urged toward the belt so as to cause engagement of an edge of the blade with the belt surface. Such conveyor belt cleaning devices must be located rearwardly of the head pulley drum on the return path of the conveyor belt so that sufficient flexibility in the belt is provided to permit transverse movement thereof when protruding objects pass the cleaning device. In such arrangements, the belt cleaning device is hampered constantly by obstructions such as mechanical fasteners carried by the belt at high speeds, which are often driven by hundreds of horsepower.

Among the various improved belt scrapers which have been proposed or are now in use are conveyor belt scrapers as disclosed by Willem Dirk Veenhof in U.S. Pat. Nos. 4,349,098 and 4,498,577. According to those arrangements, a conveyor belt scraper assembly includes a plurality of wear resistant scraper elements mounted on one or more flexible tension members for yieldable engagement with the curved surface of the conveyor belt. This belt scraper assembly is positioned beneath the overhang defined by the discharge pulley drum. Each flexible tension member and associated scraper elements are held in a helical course of engagement with the curved surface of the conveyor belt. An uppermost crossbar is located inwardly of the overhang portion of the pulley so that conveyed material will not wedge between the belt surface and the bar. A lower crossbar is located near the tangent line of the belt and pulley. The arcuate course followed by the separate cleaning members closely conforms with the surface of the conveyor belt as it curves around the pulley drum. Elastic tension induced in each flexible cleaning member applies a yieldable thrust against the curved conveyor belt surface.

In the arrangement disclosed in U.S. Pat. No. 4,498,577, each cleaning member is composed of a series of scraper elements of tungsten carbide material threaded onto a flexible cable. The scraper elements are separated by spacer springs. The spacer springs position the scraper elements perpendicular to the belt surface but allow the elements to deflect momentarily to permit obstructions, such as mechanical fasteners, to pass without snagging or damaging the belt or the scraper assembly.

The foregoing flexible scraper assemblies have proven effective and efficient in cleaning conveyor belt surfaces in a wide variety of applications. However, severe tension loads may be induced within the cable strands under certain load conditions. The tension developed within the cables which support the scraper elements vary in a nonlinear relationship with the frictional force of engagement established between the scraper elements and the conveyor belt. The coefficient of frictional engagement varies from a level of about 0.2 (floating) to a level of about 1.0, in which seizure engagement may occur. The effect is similar to operation of a band brake in which the band brake rides (floats) freely upon a shaft with nominal drag (friction 0.2), and when the frictional forces rise above a crossover level, seizure engagement occurs (friction 1.0).

Such locking engagement can occur between the scraper elements and the belt in the absence of load material when there is direct engagement between the scraping elements and the conveyor belt itself, or when the deflection of the scraper cable and the thrusting force of engagement between the flexible scraper and the conveyor belt becomes excessive. In response to such severe loading, the scraper elements deflect and lock onto the cable, thereby transmitting damaging pinching forces onto the cable, and causing premature wear or failure.

A particularly damaging situation has been encountered in the operation of conveyor belts in an unloaded condition. When the conveyor belt is operated unloaded, there is increased frictional engagement between the scraper blades and the belt surface in the absence of adhering material which buffers the scraper blades. The operation of a conveyor belt in an unloaded condition may occur, for example, when the loading hopper depletes and the conveyor is kept running until the hopper is reloaded. Unloaded operation may take place in a multiple conveyor belt installation, where the conveyor belts are started at different times and are run in unloaded condition until all conveyor belts are up to speed. It is not uncommon for such an operation involving multiple conveyor belts to run unloaded over a period of two hours or more. Additionally, the effect of running a conveyor belt in an unloaded condition is experienced when a belt having a higher capacity (e.g. 500 tonnes per hour) is fed at a substantially lower rate, for example 200 tonnes per hour, so that a substantial portion of the conveyor belt is running clean.

Another situation in which the scraper elements may be subjected to damaging loading is in connection with conveyors which handle wood chips. The sap level within the wood chips varies seasonally, and when sap rises within the trees, the wood chips will deposit sap onto the conveyor belt. When the sap hardens, it forms a resinous layer on the belt which imposes a substantial drag factor on the scraper blades. When this occurs, the scraper blades will pull over, lock against the cable, and pinching forces which develop may cause the cable to shear.

In each of the foregoing situations, the dynamic loading effect associated with the material adhering to the belt, and the direct engagement of the scraper blades against the belt when it is running empty, imposes extreme tension forces within the scraper strands, which inevitably leads to premature wear and breakage of the cables.

In the foregoing prior art arrangements, the scraper elements have been of uniform size, either circular discs or rectangular blades. Because of such uniform size, the static deflection of the flexible support cable relative to the curved surface of the conveyor belt was substantially equal in displacement along the course of scraper engagement. As used herein, the term "static deflection" refers to the spacing distance between the support cable and the conveyor belt surface at a point along the cable at which a scraper element is engaged against the belt, and with the conveyor not moving. Thus, when the scraper elements carried on a support cable are of equal size, the static deflection as measured at each scraper element location is substantially constant, from one scraper element location to another.

SUMMARY OF THE INVENTION

During the operation of the foregoing prior art scrapers, it was assumed that a static deflection arrangement of the scraper blades would give rise to substantially uniform deflection forces and that concentration of pinching forces would be avoided. Moreover, it was believed that cable failure would be equally likely to occur at each of the scraper blade locations. However, inspection of failed prior art scrapers has indicated that each case of cable failure has occured at the location of the leading scraper blade. Inspection of the remaining scraper blade locations has shown that the second scraper blade cable location would be almost cut through, and with the cable being worn by a lesser amount at each subsequent scraper location.

It is apparent that the reason for such cable failure is that pinching forces are concentrated on the leading scraper blade. The concentration of pinching forces is caused by a dynamic loading effect in which the leading scraper blade becomes an anchor point and each successive scraper blade imposes a drag force on the one ahead of it. That is, the leading scraper blade (the first blade in the direction of belt travel) is subjected to the total drag force imposed by all of the scraper blades, whereas the last scraper blade is subjected only to a fraction of the overall loading. In such prior arrangements, the cable was guided about the conveyor belt surface somewhat in a helical path with the result that the "band brake" effect referred to above caused the concentration of deflection forces onto the leading scraper blade.

According to the present invention, the concentration of forces onto the leading scraper blade, and onto each subsequent scraper blade mounted onto the cable, is relieved by controlling the deflection of the cable in such a manner that deflection of the cable is substantially shifted to one or more scraper blades located on the trailing end of the cable, with the leading portion of the cable extending in a straight line in parallel with a tangent to the belt surface. It is necessary to impose a deflection within the cable to produce a resultant thrust. In the prior art arrangement, static cable deflection was imposed substantially uniformly onto each scraper blade as the scraper followed a helical path of engagement about the conveyor belt.

In contrast, according to the present invention, the leading portion of the cable is maintained substantially straight, with deflection being imposed along the trailing end of the scraper cable. The resultant deflection loading is nonlinear, with the greatest deflection loading being imposed about the scraper blades along the trailing end of the cable According to this arrangement, the leading portion of the cable is made as straight as possible through the scraper blades which engage the conveyor belt on either side of a tangent point, with the desired degree of deflection being imposed along the trailing end of the scraper cable.

Deflection loading is, accordingly, not uniform from blade-to-blade, but is shifted toward the trailing end of the cable, with the scraper blades on the trailing end being subjected to the greatest loading. Additionally, the overall deflection loading imposed on the scraper blades is substantially reduced as compared with the prior art arrangement, with the deflection loading being controlled in the sense that it is applied or focused on the scraper blades along the trailing end of the cable rather than on the leading end of the cable.

Because the magnitude of the deflection loading is limited, and because deflection loading is shifted to the scraper blades mounted on the trailing end of the cable, the scraper blades are maintained in "floating" engagement with the conveyor belt. In this arrangement, the drag forces will not exceed the transition level which would cause a "band brake" seizure condition to arise which could peel away the belt surface and cause damaging pinching forces to be imposed upon the cable.

Controlled deflection is applied along the trailing end of the flexible cable in a first embodiment in which two scraper blades of equal size are symmetrically disposed about the tangent point along the leading end of the cable, with the leading end of the cable extending in parallel with a tangent line drawn through the tangent point. Controlled deflection is obtained by extending the trailing end of the scraper cable inwardly toward the conveyor belt. According to this arrangement, the magnitude of the applied deflection force is limited and controlled by the degree of angular displacement, and the deflection force is shifted away from the scraper blade mounted on the leading end of the cable to the scraper blade mounted on the trailing end of the cable.

According to another embodiment of the present invention, the concentration of deflection forces are shifted from the leading scraper blade by providing scraper elements having different sizes relative to each other for imposing a controlled deflection along the trailing end of the flexible cable. In one embodiment, two scraper blades of equal size are disposed about the tangent point along the leading end of the cable, with the size of one or more scraper blades along the trailing end of the cable being larger. In that arrangement, the smaller scraper blades are symmetrically located on the leading end of the cable at first and second deflection points which are substantially equally spaced about the tangent point. One or more larger scraper blades are spaced along the trailing end of the cable for establishing a desired level of deflection.

In an alternative arrangement, the static deflection points along the support cable are located at successively greater deflection distances relative to the curved surface of the conveyor belt. In this arrangement, the size of the scraper elements increases from one deflection point to another along the cable in the direction of conveyor belt movement. That is, the flexible support cable is spaced at successively greater static deflection distances with respect to the conveyor belt by the successively larger scraper elements. As a result of this arrangement, the leading end of the cable is maintained substantially straight, with the desired deflection being established incrementally along the trailing end of the cable.

The superior features and advantages of the present invention will be further appreciated by those skilled in the art upon reading the detailed description as follows in conjunction with the attached drawings.

BRIEF DESCRIPTION OF THE DRAWINGS

FIG. 13 is a simplified elevational view which illustrates deflection engagement of a symmetrical four-blade scraper; and, FIG. 14 is a side elevation view of the symmetrical scraper of FIG. 13.

DETAILED DESCRIPTION OF THE PREFERRED EMBODIMENTS

Figure 1:
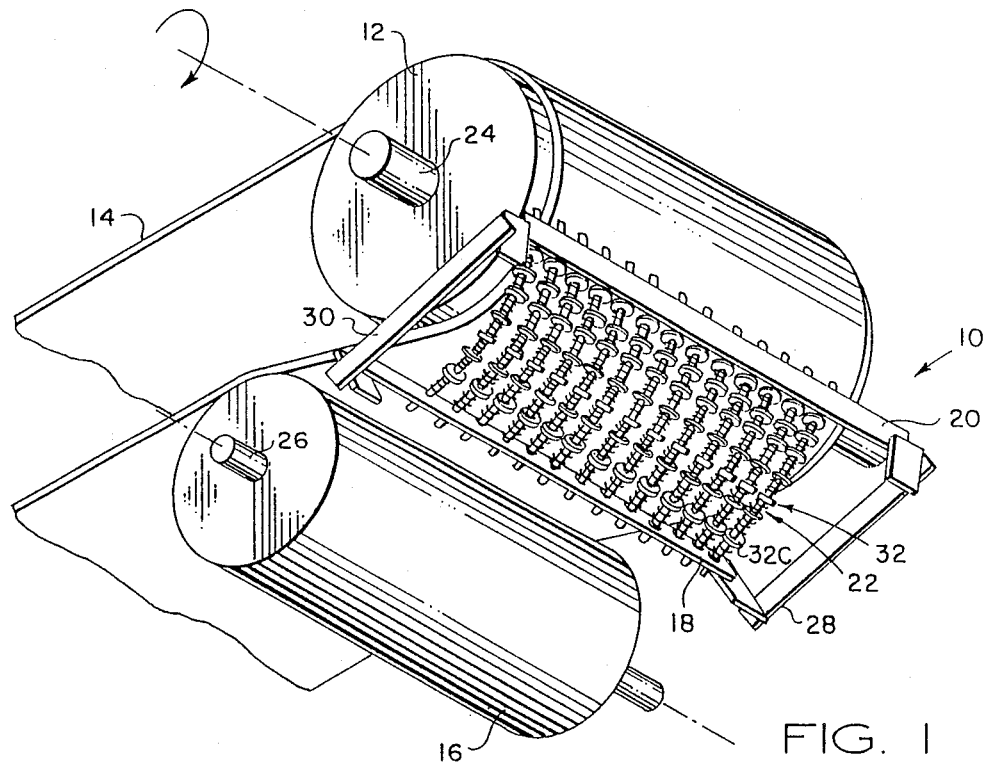
FIG. 1 is a perspective underneath view of a head pulley drum of a conveyor belt assembly, illustrating one form of a conveyor belt cleaning device in operation.

In the description which follows like parts are indicated throughout the specification and drawings with the same reference numerals, respectively. The drawings are not necessarily to scale and certain parts have been exaggerated to better illustrate details of the present invention.

Figure 2:
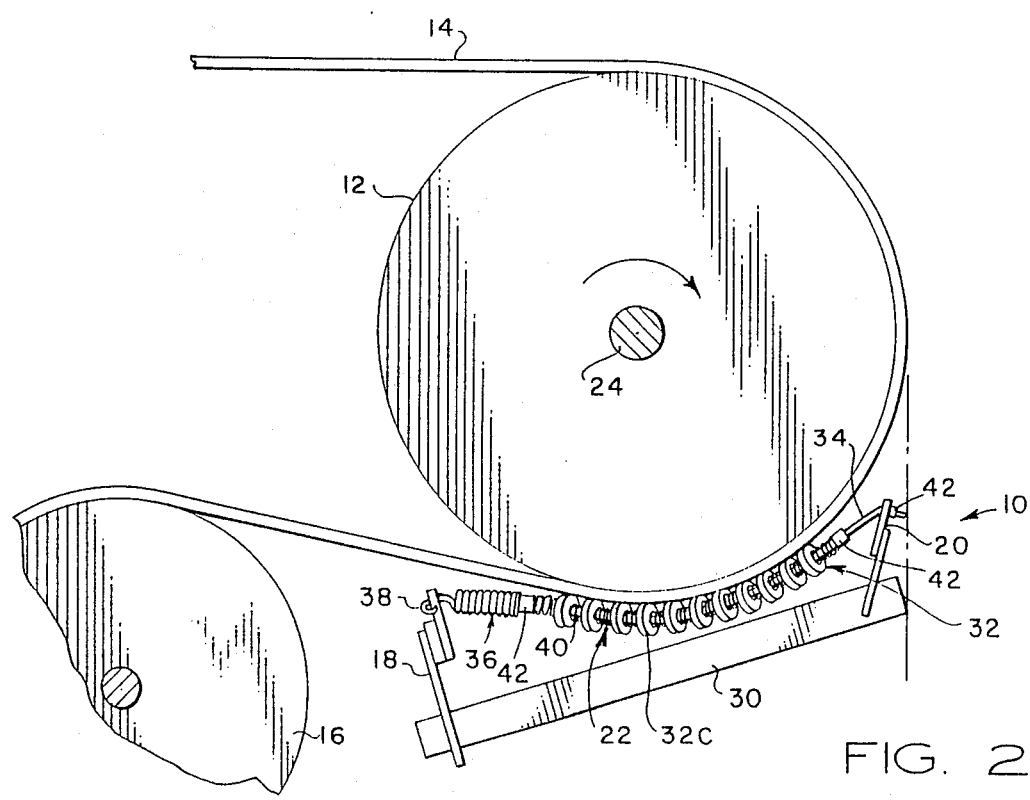
FIG. 2 is a side elevation view of the same conveyor belt cleaning device as shown in FIG. 1.

Referring now to FIGS. 1 and 2 of the drawings, a conveyor belt cleaning assembly generally indicated by the numeral 10 is located beneath the overhang of a head pulley drum 12 supporting a conveyor belt 14 passing therearound. The conveyor belt 14 is an endless flexible belt, traveling over drive, tail-end and bend pulleys 16, and over belt idlers or a slider bed. The conveyor belt 14 is suitable for handling a variety of materials in a wide range of particle sizes over long distances, up and down slopes.

The supporting framework for the conveyor belt cleaning assembly 10 includes two parallel transversely extending crossbars 18, 20 which provide lower and upper supports for an array of flexible cleaning devices 22. It will be understood that the head pulley drum 12 and bend pulley 16 are mounted on shafts 24, 26 respectively, which are supported at opposite ends for rotation on bearings in the usual manner.

The uppermost crossbar 20 is located inwardly of the overhang portion of the head pulley drum so that conveyed material, and in particular lumps thereof, will not become wedged between the belt surface and the bar 20 when traveling along the discharge path within a discharge chute. The lower support bar 18 is located substantially beneath the axis of rotation of the head pulley drum 12 and a small distance away from the belt surface itself. The crossbars 18, 20 are stabilized at each end by braces 28, 30.

The frame of the scraper assembly 10 is rigidly mounted onto the conveyor structure, with its orientation relative to the curved surface of the conveyor belt in the overhang region being fixed, thereby preserving the helical engagement of the flexible cleaning members 22. The lower crossbar 18 and upper crossbar 20 are dimensioned and spaced appropriately whereby the upper spacing between the leading edge of the crossbar 20 with respect to the curved surface of the conveyor belt is about ¾" (20mm) clear of the belt surface, with the lower crossbar 18 spacing being about 1" (25mm) clear of the belt surface.

Figure 12:
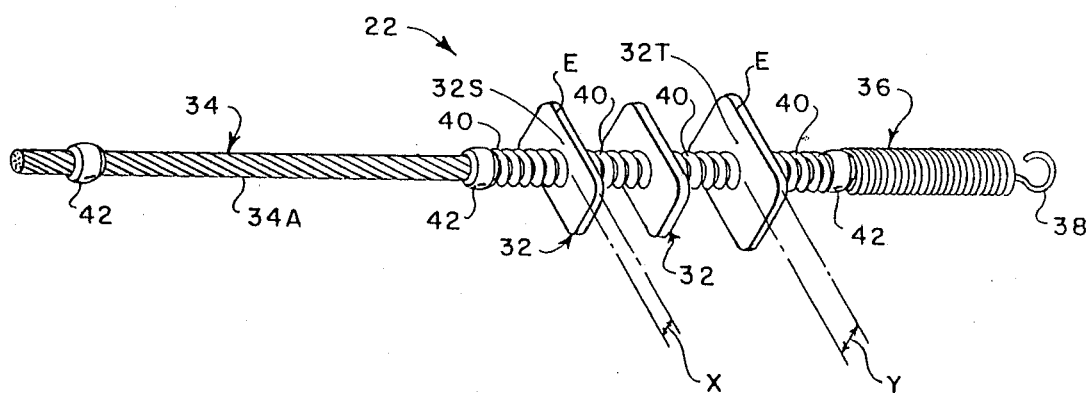
FIG. 12 is a perspective view of a single scraper strand having multiple scraper blades.

The line between the crossbars 18, 20 intersects the curved path of the conveyor belt 14 and thus a flexible conveyor belt cleaning device is required. Resilient cleaning action is provided in the flexible cleaning member 22 by a series of scraper elements 32 of a wear resistant material such as tungsten carbide or hard steel alloys movably threaded onto a high strength flexible tension member 34. The tension member 34 is preferably a stainless steel stranded cable. In the preferred embodiment, the scraper elements are blades 32 having a substantially rectangular configuration as shown in FIG. 12. Other scraper element configurations, such as circular disks 32C may be used to good advantage.

The flexible cleaning device 22 includes at least one anchor spring 36 connected by a hook fastener 38 through an eyelet formed in the lower crossbar 18. Each scraper element 32 is closely fitted about the tension member 34, but is slightly rotatable with respect thereto. Moreover, each scraper element is movable with respect to the tension member so that it will deflect or twist and yield to a surface irregularity without snagging or otherwise causing damage.

A preferred embodiment is illustrated in FIG. 12. The scraper elements 32 are separated by resilient spacer coils 40, preferably in the form of a stainless steel coil spring. The flexible tension member 34 is threaded through each scraper element 32 and through each spacer coil 40, with the spacer coil 40 at the extreme right end of the tension member being jammed against a clamp ball 42 adjacent the anchor spring 36. The anchor spring 36 is retained onto the tension member 34 by the swaged clamp ball 42. Each scraper element 32 is preferably a rectangular blade of tungsten carbide steel, and is provided with an edge E for scraping load material away from the conveyor belt 14. Unequal static deflection distances X and Y are established by spacing portions 32S and 32T, respectively.

The desired amount of compression force is developed by compressing the spacer coils 40 and scraper elements 32 between the swaged clamp ball 42 at the lower end of the scraper assembly, and the clamp ball 42 at the left end of the assembly. The upper clamp ball 42 serves as a retainer for the anchor spring 36, while the lower clamp ball 42 serves as a fastener for engaging the lower crossbar 18. Each clamp ball is disposed in swaged engagement with the tension member 34 at opposite ends, respectively. According to this arrangement, the scraper elements 32 and compression coils 40 undergo compressive loading at all times, with each scraper element 32 automatically returning to the upright scraping position relative to the conveyor belt after being deflected by a conveyor belt surface irregularity such as a protruding fastener.

Any suitable number of conveyor belt cleaning members 22, as just described, may be provided to provide scraping coverage across the entire width of the conveyor belt 14. In the example illustrated in FIG. 1, 14 scraping members are illustrated, but it will be appreciated that fewer or more such devices, as desired, may be utilized to good advantage, with the scraper element diameter and transverse angle of engagement being adjusted to provide complete surface coverage, according to conveyor belt dimensions.

In the illustrated embodiment of this invention, each of the conveyor belt cleaning devices 22 has an anchor spring 36 secured to the lower transverse crossbar assembly 20. The cleaning elements 32 of each scraper strand are held in yieldable contact with the belt surface by the cable 34 which is attached, at its other end, to the upper transverse crossbar 18 at a position laterally spaced relative to the point of attachment of the upper crossbar 20.

It will be understood that as a result of the anchor spring 36 and the flexible nature of the tension member 34, each of the above described conveyor belt scraper members 22 will be held in yieldable, thrusting engagement with the surface of the conveyor belt 14 apart from its leading and trailing end portions. The conveyor belt scraping members 22, illustrated in this particular embodiment of the invention, are arranged such that they overlap in their operative positions and thereby clean the entire width of the conveyor belt apart, possibly, from the absolute edge regions.

The leading upper end of each tension member 34 is coupled to the upper support crossbar 18 by means of a ball stop 42 which is swaged about the terminal end portion of the tension member 34. The trailing lower end portion of the tension member 34 is attached by the anchor spring 36 in a notched opening or keyway formed in the lower crossbar. The tension members 34 are cut to a preselected length determined by pulley diameter, scraper pitch and belt width. A desired amount of tension is induced within the tension members by adjusting take-up screws (not illustrated) coupled between the lower crossbar 18 and the scraper frame.

Figure 3:
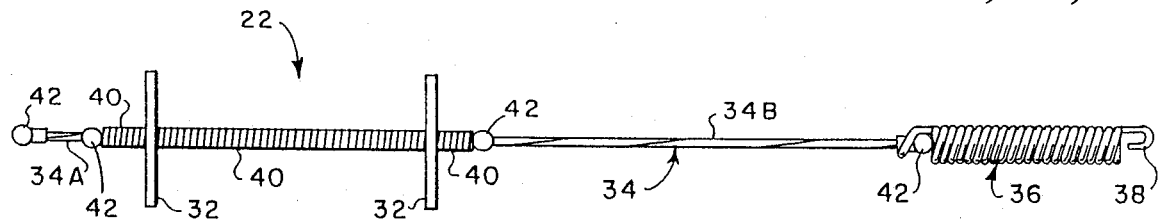
FIG. 3 is a simplified side elevation view of a two-blade scraper device constructed according to the present invention.
Figure 4:
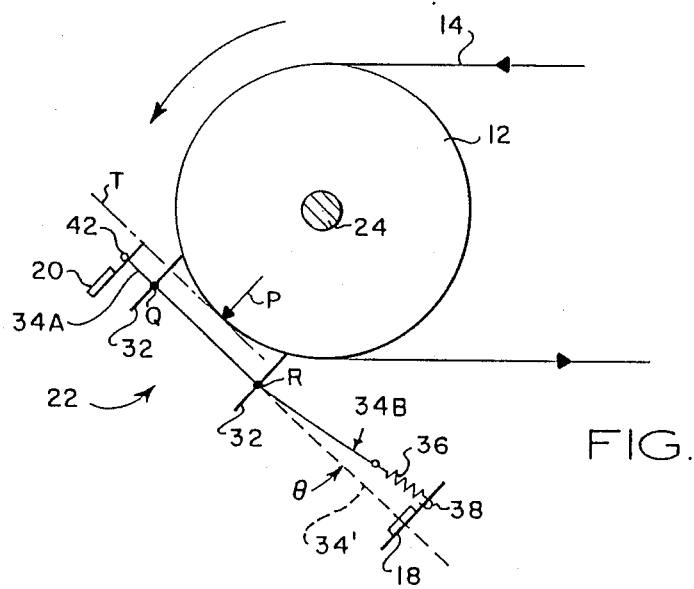
FIG. 4 is a simplified elevation view which illustrates deflection engagement of the scraper device of FIG. 3.

Referring now to FIGS. 3 and 4, controlled deflection is established by a first embodiment in which two scraper blades 32 of equal size are symmetrically disposed about a tangent point P along the leading end 34A of the cable, with the leading end 34A extending parallel with a tangent line T drawn through the tangent point P. Controlled deflection is obtained by extending the trailing end 34B of the scraper cable inwardly toward the conveyor belt 14. A small deflection angle $\theta$ is thereby defined between the deflected trailing cable end portion 34B and the projection 34' of the straight leading cable segment 34A. According to this arrangement, the magnitude of the applied deflection force is limited and controlled by the degree of angular displacement $\theta$. As a result, the deflection force is shifted away from the scraper blade 32 mounted on the leading end 34A of the cable to the scraper blade mounted onto the trailing end 34B of the cable. It should be understood that the orientation illustrated in FIG. 4 corresponds with the location of static deflection points Q, R relative to the surface of the conveyor belt 14.

Figure 5:
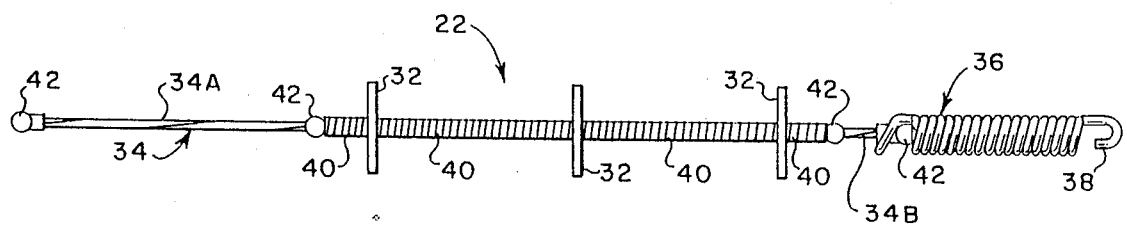
FIG. 5 is a view similar to FIG. 3 which illustrates a three-blade arrangement.
Figure 6:
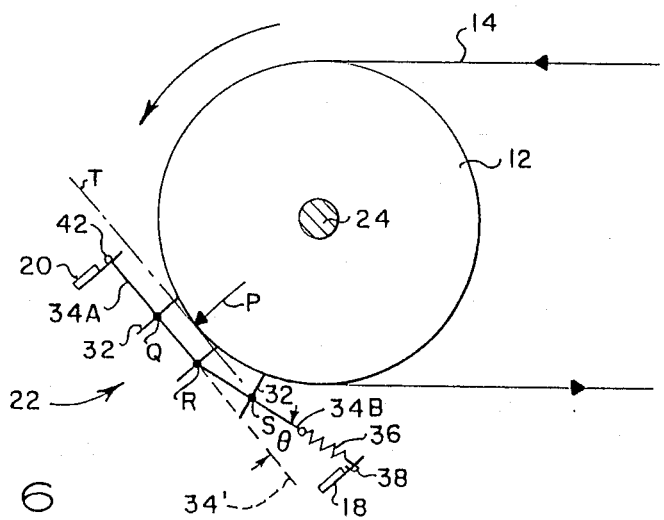
FIG. 6 is a view similar to FIG. 4 which illustrates deflection engagement of the three-blade arrangement.

Referring now to FIGS. 5 and 6, a three-blade arrangement is illustrated in which the scraper blades 32 have equal dimensions and equal spacing along the cable 34. In this arrangement, the first two scraper blades corresponding with deflection points Q and R are mounted onto the leading end 34A of the cable for engaging the conveyor belt at equally-spaced locations relative to a tangent point P. According to this arrangement, the leading end 34A is extended in parallel relation with a tangent line T which extends through the tangent point P. A desired amount of deflection is established by a third scraper blade 32 which is located at deflection point S. In this arrangement, the trailing end 34B is extended at a small deflection angle $\theta$ relative to the leading cable segment projection 34' to produce the desired level of deflection loading.

Figure 7:
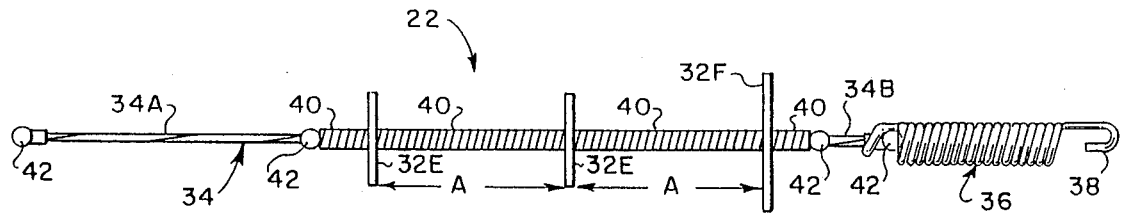
FIG. 7 is a side elevation view of a single scraper strand having scraper blades of unequal size.
Figure 8:
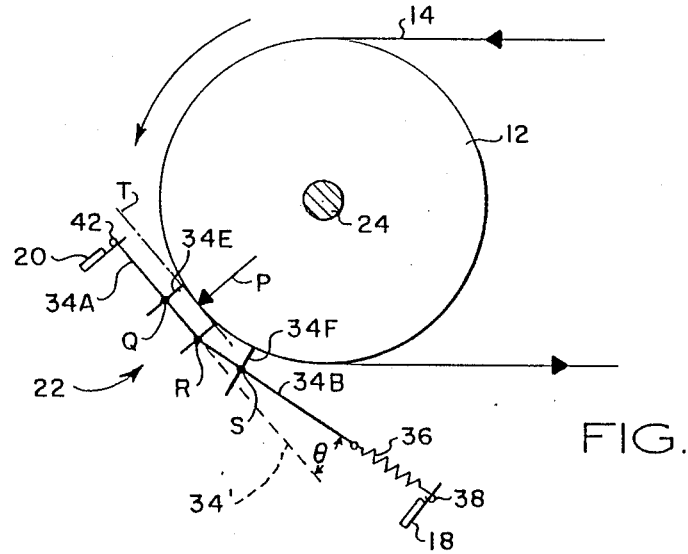
FIG. 8 is a simplified elevation view which illustrates deflection engagement of the scraper of FIG. 7.

According to a preferred embodiment as shown in FIGS. 7 and 8, a three-blade scraper assembly 22 is provided with two scraper blades 32E of equal size mounted on the leading end 34A of the cable, and a larger scraper blade 34F mounted on the trailing end 34B of the cable. In this arrangement, the scraper blades are equally spaced by a distance A along the cable 34.

Figure 9:
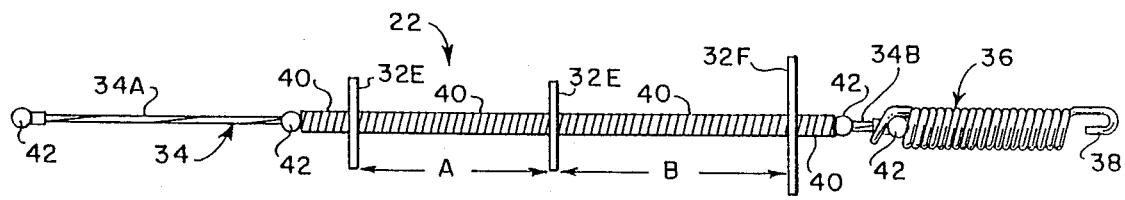
FIG. 9 is a side elevation view of a single scraper strand having scraper blades of unequal size and unequal spacing.
Figure 10:
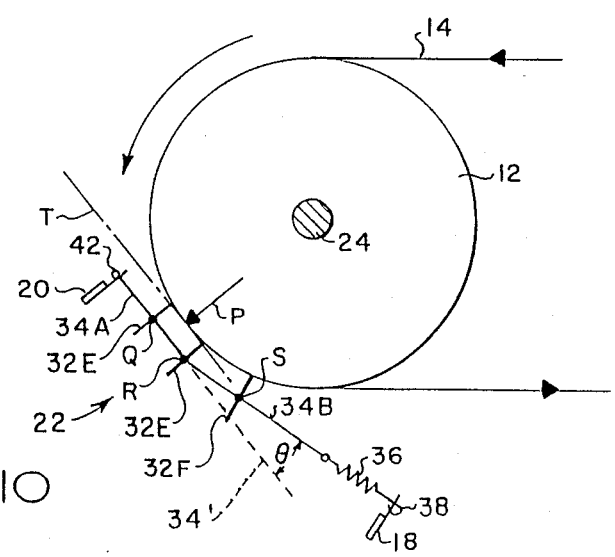
FIG. 10 is a simplified elevation view which illustrates deflection engagement of the scraper of FIG. 9.

In a similar arrangement as shown in FIGS. 9 and 10, scraper blades 32E are spaced apart by a distance A and the larger scraper blade 34F is spaced at a greater distance B with respect to the center scraper blade 32E.

According to the arrangements as shown in FIGS. 8 and 10, by providing scraper elements having different sizes relative to each other, it is possible to shift the concentration of deflection forces away from the leading scraper blade and thereby impose a controlled deflection along the trailing end of the flexible cable. While the unequal scraper blade arrangements can be used in combination with virtually any pulley diameter, they are particularly well suited for use with pulleys of smaller diameters.

Figure 11:
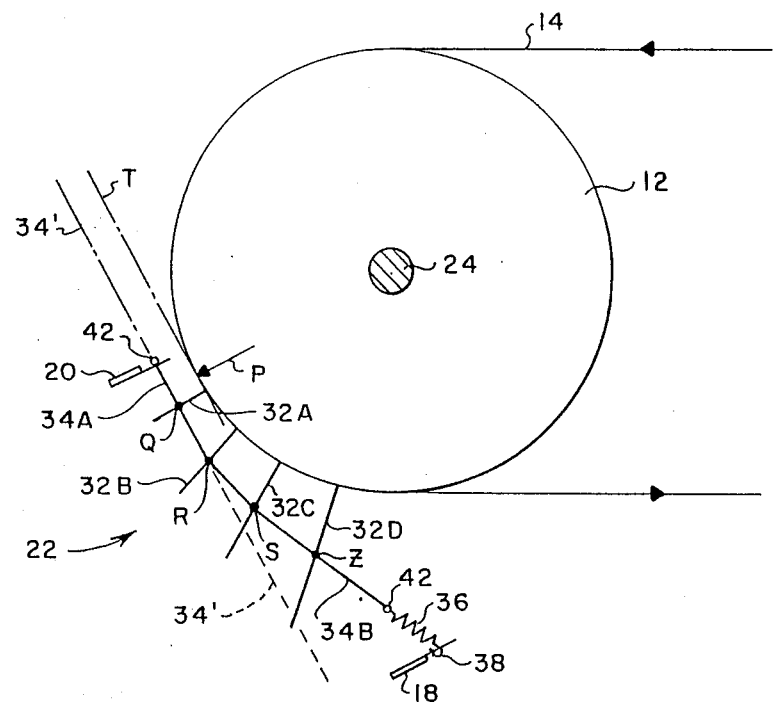
FIG. 11 is a simplified elevation view which illustrates deflection engagement of a four-blade scraper.

Referring now to FIG. 11, the static deflection points Q, R, S and Z along the support cable 34 are located at successively greater deflection distances relative to the curved surface of the conveyor belt 14. In this arrangement, the scraper blades 32A, 32B, 32C, 32D increase in size from one deflection point to another along the cable in the direction of conveyor belt travel. That is, the flexible support cable is spaced at successively greater static deflection distances with respect to the conveyor belt by the successively larger scraper blades. As a result of this arrangement, the leading end 34A of the cable is maintained substantially straight, and in parallel with the tangent line T, while the desired deflection is established incrementally along the trailing end 34B of the cable.

Controlled deflection is provided by yet another scraper assembly 22 as illustrated in FIGS. 13 and 14. In the arrangement of FIG. 13, a first pair of scraper blades 32E of equal dimensions are spaced between a pair of larger scraper blades 32F. In this symmetrical arrangement, the blades are equally spaced relative to each other by a distance A. A large blade 32F and a smaller blade 32E are mounted on the leading end 34A of the cable, while a smaller blade 32E and a larger blade 32F are mounted on the trailing end 34B of the cable. The crossbars 18, 20 are positioned such that the inside smaller blades 32E are symmetrically disposed with respect to a tangent point P. According to this arrangement, the smaller blades 32E are equally spaced with respect to the tangent point and establish equally spaced static deflection points R, S. The larger scraper blades 32F are likewise symmetrically disposed with respect to the tangent point P and establish a second set of equally spaced static deflection points Q, Z. The trailing end 32B of the cable is deflected by the angle $\theta$ relative to the leading cable segment projection 34'. The projection segment 34' extends in parallel with the tangent line T. According to this arrangement, the thrusting forces are reacted substantially by the blades 32E, 32F which are mounted onto the trailing end 34B of the cable.

The belt cleaning assembly 10 is mechanically supported adjacent the curved surface of the conveyor belt 14 in the overhang region beneath the pulley drum 12 with the inside smaller scraper blades 32E being positioned in equally spaced relation about a tangent point P. The assembly is moved toward the belt until the inside smaller scraper blades 32E engage the belt surface. In this position, the forward larger blade 32F and the trailing larger blade 32F are clear of the belt. The upper crossbar 20 is then raised until the leading scraper blade 32F is brought into contact with the curved surface of the conveyor belt, thereby establishing static deflection point Q. The lower crossbar 18 is also raised until the trailing blade 32F engages the curved surface of the conveyor belt, thereby establishing static deflection point Z.

In the foregoing arrangement, the cable 34 is substantially a straight line and the scraper blades provide good floating action but have very little take-up. To achieve an effective level of take-up (scraping action), the lower crossbar 18 is again raised slightly, with the assembly 10 being rotated slightly about the upper crossbar 20, thereby causing the trailing cable end portion 34B to be angularly displaced inwardly by an angle $\theta$ with respect to the leading cable projection 34'. It should be understood that the foregoing set-up arrangement is based upon static engagement of the scraper blades against the curved surface of the conveyor belt, and the illustration in FIG. 14 depicts the arrangement of the cable and the scraper blades in such static engagement condition.

It will be appreciated that the foregoing arrangements are effective for shifting the concentration of thrust forces away from the leading scraper blade, with such thrusting forces being reacted substantially by scraper blades along the trailing end of the cable. As a result, deflection of the flexible cable 34 is carefully controlled to provide adequate take-up while permitting the scraper blades to "float" against the conveyor belt, thereby avoiding premature wear and breakage of the cables.

Although the invention has been described with reference to specific blade embodiments, and with reference to specific belt loading conditions, the foregoing description is not intended to be construed in a limiting sense. Various modifications of the disclosed embodiment as well as alternative applications of the invention will be suggested to persons skilled in the art by the foregoing specifications and illustrations. It is therefore contemplated that the appended claims will cover any such modifications or embodiments that fall within the true scope of the invention.

What is claimed is:

1. A belt scraper assembly for use in combination with a conveyor belt of the type driven by a pulley drum, said belt scraper assembly including first and second crossbar members adapted to be mounted in operative positions about the overhang region of the pulley drum, respectively; an array of elongated, flexible scraping members supported between said first and second crossbar members for engaging the curved surface of a conveyor belt in the overhang region of a pulley drum, each scraping member having one end portion coupled to one of said crossbar members and an opposite end portion coupled to the other of said crossbars; bias means coupled to said scraping member for maintaining each scraping member in yieldable, thrusting engagement with the curved surface of a conveyor belt in the pulley drum overhang region; each scraping member including an elongated flexible tension member having a leading end portion and a trailing end portion; a plurality of scraper elements mounted onto said tension member, each scraper element including a spacing portion having a scraper edge for engaging a conveyor belt, each spacing portion having a spacing dimension as measured between its scraper edge and said tension member, and two of said scraper elements having unequal spacing dimensions for establishing unequal static deflection distances of said tension member relative to the surface of a conveyor belt in response to static engagement of said belt by said scraper elements.

2. A conveyor belt cleaning device comprising, in combination:
   a flexible tension member;
   a plurality of wear-resistant scraper elements movably coupled to said tension member, each scraper element including a spacing portion having a scraper edge for engaging a conveyor belt, each spacing portion having a spacing dimension as measured between its scraper edge and said tension member;
   spacer means compressively engaging and yieldably separating said scraper elements; and,
   two of said scraper elements having unequal spacing portions for establishing unequal static deflection distances of said tension member relative to the surface of a conveyor belt in response to static engagement of said belt by said scraper elements.

3. A conveyor belt cleaning device as defined in claim 2, said combination including first, second and third scraper elements, the spacing dimension of said first and second scraper elements being substantially equal to each other, and the spacing dimension of said third scraper element being greater than the spacing dimensions of said first and second scraper elements.

4. A conveyor belt cleaning device as defined in claim 2,
   said plurality of scraper elements including first and second pairs of scraper elements, the spacing portions of the scraper elements in the first pair being substantially equal in size, and the spacing portions of the scraper elements in the second pair being substantially equal to each other but larger than the spacing portions of the scraper elements of the first pair, said first pair of smaller scraper elements being disposed between the larger scraper elements of the second pair.

5. A conveyor belt cleaning device as defined in claim 2, wherein the spacing dimensions of said scraper elements are unequal, the spacing dimensions of each successive scraper element being larger than the spacing dimension of each preceding scraper element along said tension member.

6. In a conveyor belt assembly of the type having an endless conveyor belt driven by a head pulley drum, the improvement comprising a conveyor belt cleaning device mounted beneath the overhang region defined by the head pulley drum, and engaging the curved surface of the conveyor belt in the overhang region where the conveyor belt is in contact with the head pulley dru, said belt cleaning device including an elongated, flexible tension member having a leading edge portion and a trailing end portion, first and second scraper elements movably coupled to said tension member, each scraper element including a spacing portion having a scraper edge for engaging a conveyor belt, each spacing portion having a spacing dimension as measured between its scraper edge and said tension member, said scraper elements having unequal spacing portions for establishing unequal static deflection distances of said tension member relative to the surface of the conveyor belt in response to static engagement of said belt by said scraper elements, and the trailing end portion of said tension member being angularly deflected with respect to the leading end portion thereof.

* * * * *